United States Patent [19]

Tanaka

[11] Patent Number: 5,059,007
[45] Date of Patent: Oct. 22, 1991

[54] INTERNALLY FOCUSING ZOOM LENS
[75] Inventor: Tsunefumi Tanaka, Yokohama, Japan
[73] Assignee: Canon Kabushiki Kaisha, Tokyo, Japan
[21] Appl. No.: 492,589
[22] Filed: Mar. 13, 1990
[30] Foreign Application Priority Data
Mar. 17, 1989 [JP] Japan .................................. 1-65633
[51] Int. Cl.$^5$ .............................................. G02B 15/14
[52] U.S. Cl. .................................... 359/676; 359/684
[58] Field of Search ................................ 350/423, 427
[56] References Cited
U.S. PATENT DOCUMENTS
4,752,121 6/1988 Kitagishi ............................ 350/427
4,848,883 7/1989 Maruyama .......................... 350/427

Primary Examiner—Scott J. Sugarman
Attorney, Agent, or Firm—Fitzpatrick, Cella, Harper & Scinto

[57] ABSTRACT

An internally focusing zoom lens with an optical axis and a first lens group having a positive refractive power. The first lens group consists of a front lens sub-group that has a positive refractive power and a rear lens sub-group that has a negative refractive power and is disposed on an image plane side of the front lens sub-group. The rear lens sub-group consists of a positive lens with one convex surface located on the image plane side thereof and a negative lens with two concave surfaces. The rear lens sub-group is moved along the optical axis of the zoom lens for focusing the zoom lens. The zoom lens also includes a second lens group having a negative refractive power which is moved along the optical axis of the zoom lens for zooming, a third lens group which is moved along the optical axis for zooming, and a fourth lens group having a positive refractive power. The first, second, third and fourth lens groups are disposed along the optical axis in that order with the first lens group being disposed closest to an object.

8 Claims, 4 Drawing Sheets

INTERNALLY FOCUSING ZOOM LENS

BACKGROUND OF THE INVENTION

1. Field of the Invention

The present invention relates to a zoom lens which is a lens system comprising a plurality of lens groups and in which part of the lens groups other than the front lens group which are disposed near an object is moved for focusing. In particular, the present invention pertains to a zoom lens suitable for use in a photographic system, such as a single-lens reflex camera having an automatic focusing detection mechanism, still video camera and a video camera.

2. Description of the Related Art

Development trends concerning zoom lenses have been directed toward a high-power, compact and inexpensive zoom lens which can be used for almost all applications and toward a high-performance zoom lens which has an aperture ratio and an image quality as high as those of a single lens. Recently, there has also been a demand for a lens technology which is suitable for use in an auto focusing camera. In the case, for example, of a telephoto type zoom lens whose focal length (F) ranges from 80 mm to 200 mm and which has an F-number (FNO) of 2.8, the front lens group (the first lens group) used for focusing has a diameter of 70 mm or above, and this makes the overall zoom lens very heavy, resulting in slow focusing and deterioration of the control of the zoom lens.

An internal focusing type zoom lens is suitable for use in an automatic focusing camera, and various types thereof have been proposed recently. However, most of them have an F-number ranging from 4 to 5.6, because internal focusing type zoom lenses having a large aperture ratio suffer from aberration caused by focusing.

Japanese Patent Laid-Open Nos. 109952/1977, 57815/1980 and 117119/1980 and Japanese Patent Publication No. 53696/1986 have proposed an internal focusing type zoom lens in which a lens group disposed on the object side of a variable-power lens group is divided into a plurality of lens groups and in which part of the plurality of lens groups other than the front lens group is moved for focusing. Such an internal focusing type zoom lens in which part of the lens groups disposed on the object side of the variable-power lens group is moved for focusing is characterized in that no shifting of focus occurs even if the zoom lens is focused at any zooming position and in that it is focused on a certain object at any zooming position by moving the focusing lens group thereof by a fixed distance.

Furthermore, the internal focusing type zoom lens has a focusing lens group which is lighter in weight than the first lens group in a zoom lens which is moved altogether for focusing, and therefore requires lower torque to drive the focusing lens group when the zoom lens is, for example, applied to a camera having an automatic focusing detection mechanism. This enables speedy focusing to be achieved.

In general, a telephoto type zoom lens suffers from variations in aberration caused by focusing. In particular, the internal focusing type zoom lens suffers from a large degree of variations in the aberration caused by focusing, although it has the above-described advantages. This makes it very difficult for a high optical performance of the zoom lens to be maintained over the entire object distance.

SUMMARY OF THE INVENTION

A primary object of the present invention is to provide a zoom lens which is capable of reducing variations in aberration caused by focusing and of maintaining excellent optical performance over an entire object distance thereof by adequately arranging a focusing lens group. A secondary object of the present invention is to provide a zoom lens having an F-number of about 2.8 which is suitable for use in a camera having an automatic focusing detection mechanism.

In order to achieve the aforementioned objects, the present invention provides a zoom lens which comprises a first lens group having a positive refractive power, a second variable-power lens group having a negative refractive power, a third lens group for compensating for the image plane which varies due to variations in magnification, the third lens group having a positive refractive power, and a fourth lens group having a fixed positive refractive power. The first, second, third and fourth lens groups are disposed in that order with the first lens group being disposed closest to an object. The first lens group is comprised of a lens sub group having a positive refractive power and a lens sub-group having a negative refractive power which is moved along an optical axis for focusing. The lens subgroup having a negative refractive power is comprised of a positive lens with one convex surface being directed toward an image plane and a negative lens with two concave surfaces.

The surfaces of the individual lenses of the lens subgroup having a negative refractive power have different absolute values of radii of curvature. The absolute values of the radii of curvature of the lens surfaces are reduced gradually, with that of the lens surface which is closest to the object being the largest. This allows variations in aberration of the zoom lens caused by focusing to be reduced, thereby enabling the zoom lens to exhibit high optical performance over the entire object distance.

BRIEF DESCRIPTION OF THE DRAWINGS

FIG. 3 is comprised of FIGS. 3 (A), 3 (B) and 3 (C) which show aberration curves obtained in Numerical Example 1 when the zoom lens is positioned at the wideangle end, the midpoint and the telephoto end, respectively; and FIG. 4 is comprised of FIGS. 4 (A), 4 (B) and 4 (C) which show aberration curves obtained in Numerical Example 2 when the zoom lens is positioned at the wideangle end, the midpoint and the telephoto end, respectively.

DETAILED DESCRIPTION OF THE PREFERRED EMBODIMENTS

Figure 1:
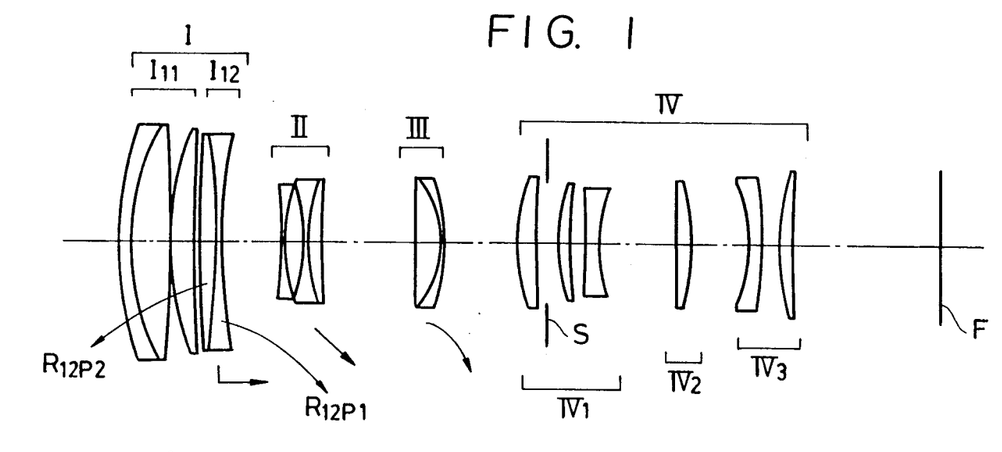
FIG. 1 is a cross sectional view of a zoom lens which is used in Numerical Example 1 of the present invention.
Figure 2:
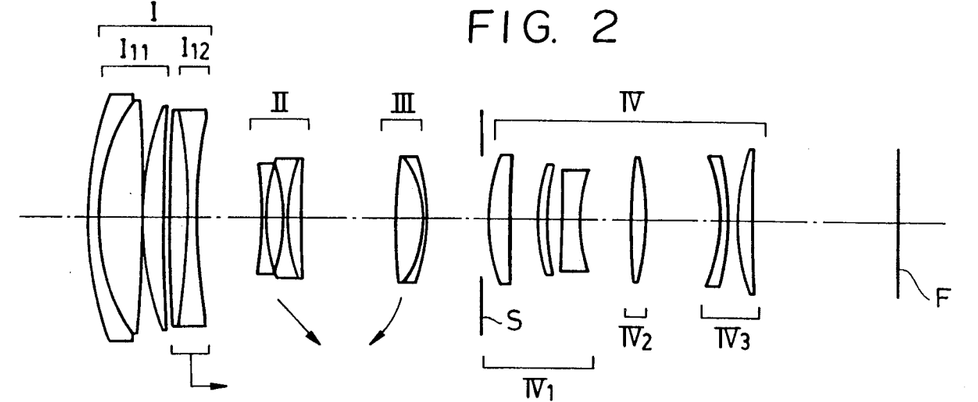
FIG. 2 is a cross-sectional view of a zoom lens which is used in Numerical Example 2 of the present invention.
Figure 3A:
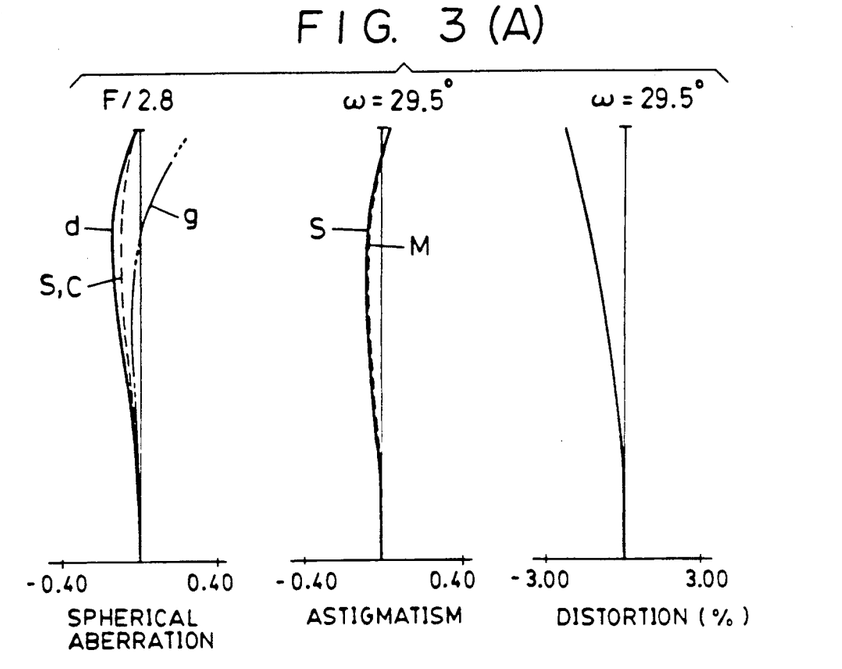
Figure 3B:
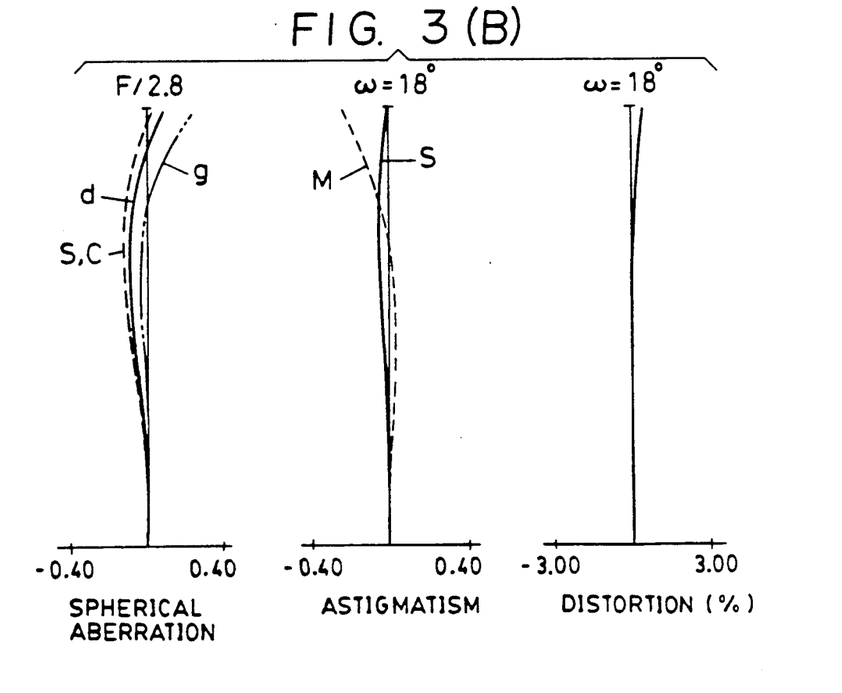
Figure 3C:
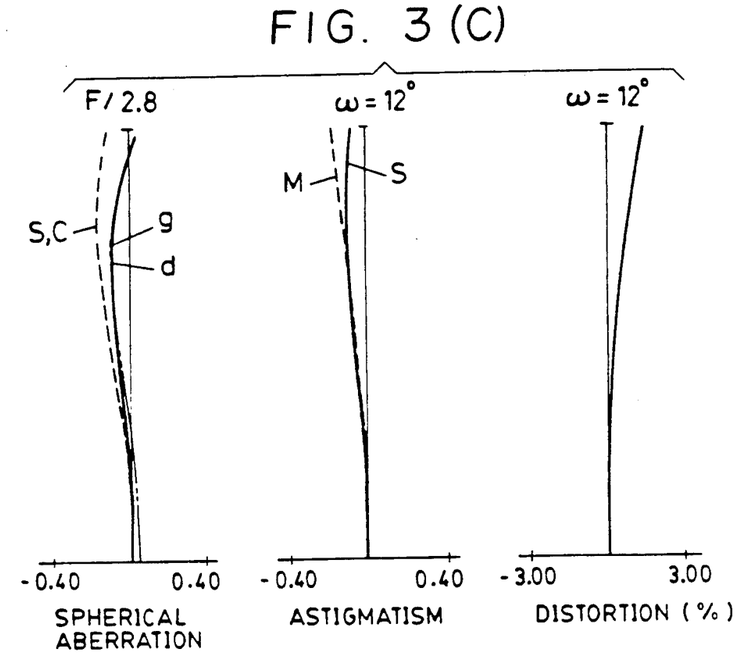
Figure 4A:
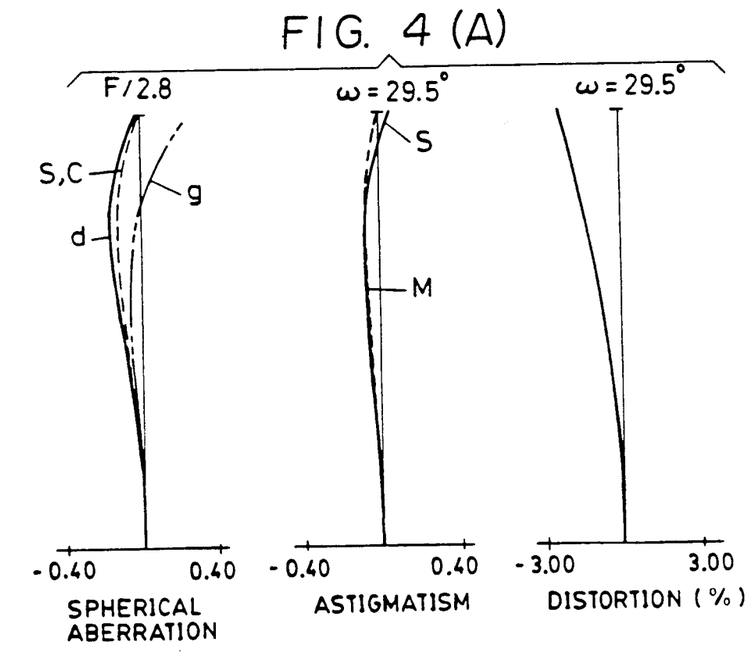
Figure 4B:
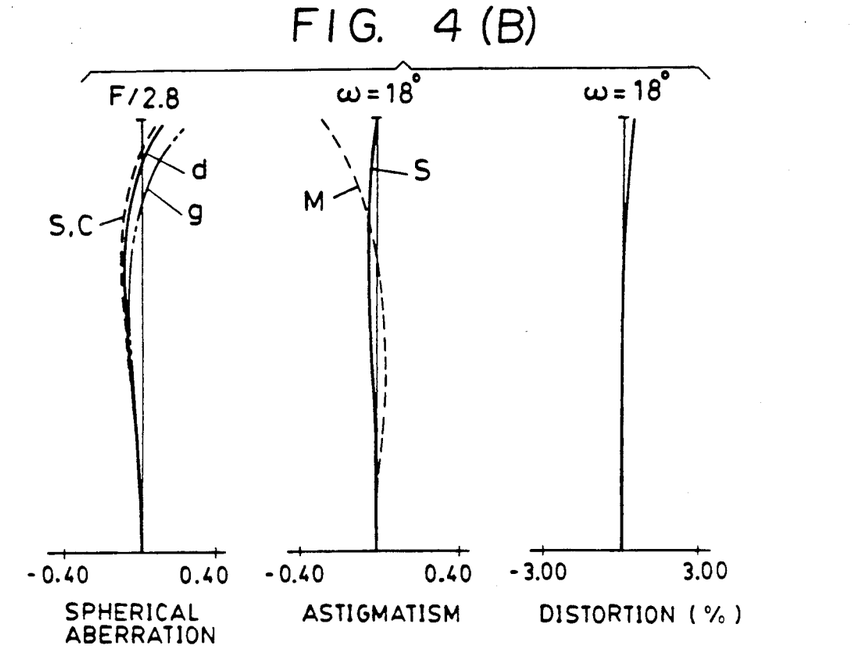
Figure 4C:
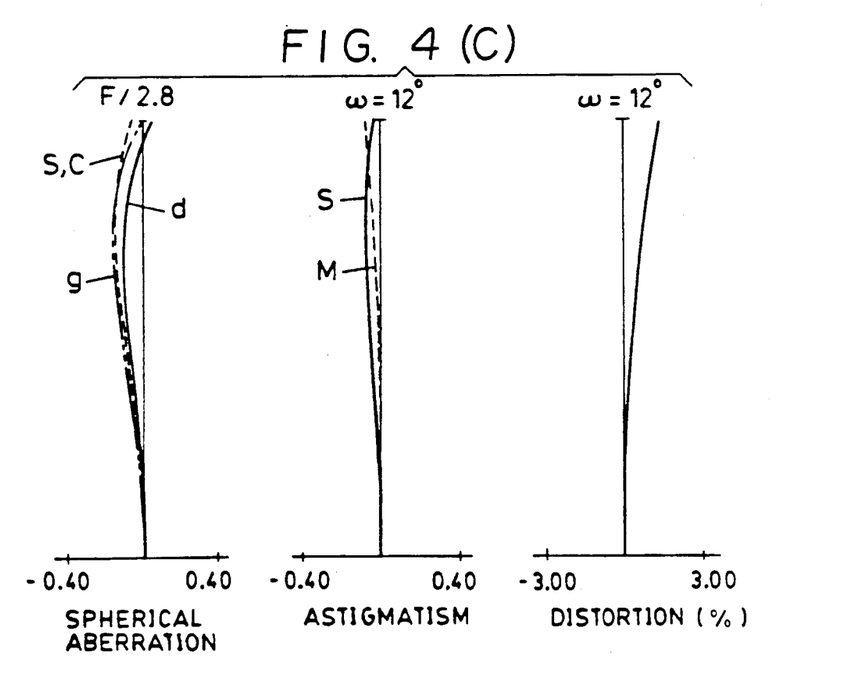

FIGS. 1 and 2 are respectively cross-sectional views of the zoom lenses which are employed in Numerical Examples 1 and 2 according to the present invention.

In FIGS. 1 and 2, a reference numeral I denotes a first lens group having a positive refractive power. The first lens group I is comprised of a lens sub-group $I_{11}$ having a fixed positive refractive power and a lens subgroup group $I_{12}$ having a negative refractive power. The lens sub-group $I_{12}$ is associated with focusing of the zoom lens. A reference numeral II denotes a second lens group which is associated with variable-power and which has a negative refractive power. A reference numeral III designates a third lens group for compensating for an image plane which varies in consequence of variations in magnification, which has a positive refractive power.

In Numerical Examples of the present invention, the lens groups II and III are moved along the optical axis in the direction indicated by the arrows for varying the magnifications ranging from the wideangle end to the telephoto end. A reference numeral IV denotes an image forming fourth lens group having a positive refractive power. A reference symbol S denotes an aperture stop.

In Numerical Examples of the present invention, the first lens group I is divided into two lens sub-groups $I_{11}$ and $I_{12}$ respectively having positive and negative refractive powers, as stated above. The rear lens sub-group $I_{12}$ having a negative refractive power is of light-weight and is moved along the optical axis in the direction indicated by the arrow so as to allow the zoom lens to be focused on an object. In this way, the lens driving force required for focusing can be decreased, and this enables the zoom lens to be focused quickly when it is applied to, for example, a camera having an automatic focusing detecting mechanism.

Furthermore, the lens sub-group $I_{12}$ preferably is comprised of a lens in which a positive lens with one convex surface being directed toward the image plane is bonded together with a negative lens having two concave surfaces. Alternatively, the lens sub-group $I_{12}$ may be comprised of these two separate lenses. In this way, in the case of a zoom lens having an F number of about 2.8, variations in the aberration, and in particular variations in the spherical aberration that are caused by focusing, can be reduced. At the same time, variations in the coma aberration, and in particular variations in the coma aberration caused by a lower bundle of rays, can be reduced. Furthermore, astigmatism can be compensated for when focusing in a balanced state.

A zoom lens such as that disclosed in Japanese Patent Publication No. 53696/1986 has a view angle (2ω) of 12 degrees and an F-number of 5.6, and therefore exhibits less variations in the spherical aberration and in the astigmatism caused by focusing. However, a zoom lens such as that according to the present invention has an F-number of 2.8, and thus suffers from variations in the coma aberration, in particular, in the coma aberration caused by the lower bundle of rays. When the lens sub-group $I_{12}$ is constructed by two lenses, variations in the spherical aberration may be reduced relatively easily. However, such a configuration is not enough to reduce variations in the coma aberration and in the astigmatism. Hence, in the present invention, a positive lens with one convex surface being directed toward the image plane is disposed on the object side of a negative lens with two concave surfaces. In this way, a high optical performance can be achieved over the entire object distance.

A bonding together of the positive and negative lenses of sub-group I makes the lens configuration simple. However, these lenses may also be separate lenses.

The internal focusing type zoom lens which is intended in the present invention essentially can be achieved by arranging the individual lens groups in the manner described above. However, variations in the aberration, and in particular variations in the chromatic aberration, caused by focusing, can be compensated for excellently if the zoom lens is arranged such that it also fulfills the following conditions.

$$0.1 < N_{12P} - N_{12N} < 0.2$$

$$10 < \nu_{12N} - \nu_{12P} < 30 \qquad (1)$$

where $N_{12P}$ and $V_{12P}$ are respectively the refractive index and Abbe number of the material of the positive lens in the lens sub-group $I_{12}$ of the first lens group, and $N_{12N}$ and $\nu_{12N}$ are respectively the refractive index and Abbe number of the material of the negative lens in the lens sub-group $I_{12}$ of first lens group.

In order to reduce variations in the aberration caused by focusing, chromatic aberration must be compensated for by means of a focusing lens sub-group $I_{12}$ that itself has a negative refractive power. Hence, in the examples of the present invention, the lens sub-group $I_{12}$ is arranged in the manner described above so as to allow the axial chromatic aberration and the chromatic difference of magnification, together with the spherical aberration, the coma aberration and astigmatism, to be compensated for in a balanced state. If the difference between the refractive powers of the positive and negative lenses and the difference between the Abbe numbers thereof deviate from the range defined by Conditional Expression (1), compensation of the chromatic aberration is difficult.

Furthermore, the spherical aberration and the coma aberration can be compensated for excellently while the astigmatism can be compensated for in a balanced state by arranging the lens sub-group $I_{12}$ and the zoom lens such that it also fulfills the following conditions:

$$|R_{12P2}| > fT$$

$$|R_{12P1}| > fT \qquad (2)$$

where $R_{12P2}$ is a radius of curvature of the surface of the positive lens which is close to the image plane, $R_{12P1}$ is a radius of curvature of the surface of the negative lens which is close to the object, and fT is the focal length of the zoom lens when it is positioned at its telephoto end.

Since an internal focusing type zoom lens requires large focusing space therein, the first lens group must be located beyond the aperture. In the normal telephoto type zoom lens, the diameter of the first lens group is substantially the same as that of the axial bundle of rays. However, in a zoom lens in which the first lens group is disposed far from the aperture, the diameter of the first lens group or the diameter of the lens in the fourth lens group which is disposed close to the image plane must be large in order to ensure sufficient marginal illumination.

Hence, in Examples of the present invention, in order to ensure sufficient marginal illumination and maintain small the diameter of both the first lens group and the lens in the fourth lens group which is disposed close to the image plane, the fourth lens group is comprised by a $IV_1$th lens group, a $IV_2$th lens group having a positive refractive power and a $IV_3$th lens group. The $IV_1$th lens group, the $IV_2$th lens group and the $IV_3$th lens group also are separated from each other by a wide air space.

When the $IV_2$th lens group having a positive refractive power is disposed relatively far from the $IV_3$th lens group, separation of the bundle of rays from the optical axis can be restricted, resulting in reduction in the size of the IV$_3$th lens group.

Furthermore, as shown by Examples of the present invention, a telephoto type zoom lens is achieved which has an F-number of about 2.8, while exhibiting excellent optical performance over the entire object distance, and ensuring sufficient marginal illumination. To achieve this result, the IV$_1$th lens group is constructed by two positive meniscus lenses and one negative lens which is disposed on the image plane side of the positive meniscus lenses, the IV$_2$th lens group is constructed by a positive lens with two convex surfaces, and the IV$_3$th lens group is constructed by a negative meniscus lens with one convex surface located on an image plane side thereof and a positive lens which is disposed on the image plane side of the negative meniscus lens.

Numerical Examples for the FIG. 1 and FIG. 2 embodiments of the present invention now follow. In these Examples, a reference symbol Ri denotes a radius of curvature of the surface of an ith lens, with the 1st lens being disposed closest to the object, a reference symbol Di denotes the thickness and the air space of the ith lens, and reference symbols Ni and $\nu$i respectively designate the refractive power and the Abbe number of the glass which constitutes the ith lens.

EXAMPLE 1

As shown in FIG. 1, there are sixteen lens elements having the following characteristics.

| | | F = 82.0 to 195.0  FNo = 1:2.8  2ω = 29.5° to 12° | | |
|---|---|---|---|---|
| I$_{11}$ | R1 = 109.98 | D1 = 3.00 | N1 = 1.80518 | $\nu$1 = 25.4 |
| | R2 = 71.06 | D2 = 0.20 | | |
| | R3 = 70.91 | D3 = 11.30 | N2 = 1.49700 | $\nu$2 = 81.6 |
| | R4 = −368.46 | D4 = 0.15 | | |
| | R5 = 89.27 | D5 = 6.80 | N3 = 1.49700 | $\nu$3 = 81.6 |
| | R6 = 970.58 | D6 = can be varied by focusing | | |
| I$_{12}$ | R7 = 875.81 | D7 = 3.80 | N4 = 1.84666 | $\nu$4 = 23.9 |
| | R8 = −273.99 | D8 = 0.10 | | |
| | R9 = −273.46 | D9 = 2.00 | N5 = 1.72000 | $\nu$5 = 43.7 |
| | R10 = 155.59 | D10 = can be varied by focusing and zooming | | |
| II | R11 = −220.25 | D11 = 1.40 | N6 = 1.77250 | $\nu$6 = 49.6 |
| | R12 = 48.23 | D12 = 5.25 | | |
| | R13 = −51.24 | D13 = 1.40 | N7 = 1.60311 | $\nu$7 = 60.7 |
| | R14 = 56.34 | D14 = 4.30 | N8 = 1.84666 | $\nu$8 = 23.9 |
| | R15 = −831.14 | D15 = can be varied by zooming | | |
| III | R16 = 153.99 | D16 = 7.30 | N9 = 1.49700 | $\nu$9 = 81.6 |
| | R17 = −34.05 | D17 = 1.40 | N10 = 1.83400 | $\nu$10 = 37.2 |
| | R18 = −52.24 | D18 = can be varied by zooming | | |
| IV | R19 = 56.29 | D19 = 5.21 | N11 = 1.80400 | $\nu$11 = 46.6 |
| | R20 = 247.68 | D20 = 6.32 | | |
| | R21 = 53.03 | D21 = 3.30 | N12 = 1.80400 | $\nu$12 = 46.6 |
| | R22 = 120.88 | D22 = 4.15 | | |
| | R23 = −934.20 | D23 = 4.04 | N13 = 1.80518 | $\nu$13 = 25.4 |
| | R24 = 45.07 | D24 = 21.55 | | |
| | R25 = 173.63 | D25 = 4.89 | N14 = 1.62230 | $\nu$14 = 53.2 |
| | R26 = −68.04 | D26 = 17.28 | | |
| | R27 = −38.44 | D27 = 3.01 | N15 = 1.78590 | $\nu$15 = 44.2 |
| | R28 = −112.76 | D28 = 5.02 | | |
| | R29 = 68.54 | D29 = 3.80 | N16 = 1.72000 | $\nu$16 = 50.2 |
| | R30 = 338.60 | | | |

| f | 82 | 135 | 195 |
|---|---|---|---|
| D10 | 17.096 | 46.340 | 60.828 |
| D15 | 25.236 | 14.112 | 0.994 |
| D18 | 21.200 | 3.079 | 1.709 |

*D10 is the thickness of the lens when the object is at the infinity.

| Object Distance | ∞ | 1.8 m |
|---|---|---|
| D6 | 1.824 | 18.208 |

EXAMPLE 2

FIG. 2 corresponds to sixteen lens elements, having the following characteristics.

| | | F = 82.0 to 195.0  FNo = 1:2.8  2ω = 29.5° to 12° | | |
|---|---|---|---|---|
| I$_{11}$ | R1 = 100.22 | D1 = 3.00 | N1 = 1.80518 | $\nu$1 = 25.4 |
| | R2 = 65.64 | D2 = 0.10 | | |
| | R3 = 65.34 | D3 = 11.80 | N2 = 1.49700 | $\nu$2 = 81.6 |
| | R4 = −453.37 | D4 = 0.15 | | |
| | R5 = 89.10 | D5 = 6.80 | N3 = 1.49700 | $\nu$3 = 81.6 |
| | R6 = 1112.94 | D6 = can be varied by focusing | | |
| I$_{12}$ | R7 = 1303.27 | D7 = 4.20 | N4 = 1.80518 | $\nu$4 = 25.4 |
| | R8 = −215.91 | D8 = 2.80 | N5 = 1.67003 | $\nu$5 = 47.3 |
| | R9 = 149.41 | D9 = can be varied by focusing and zooming | | |
| II | R10 = −180.26 | D10 = 1.40 | N6 = 1.80400 | $\nu$6 = 46.6 |
| | R11 = 47.34 | D11 = 5.25 | | |
| | R12 = −54.09 | D12 = 1.40 | N7 = 1.60311 | $\nu$7 = 60.7 |
| | R13 = 51.31 | D13 = 4.30 | N8 = 1.84666 | $\nu$8 = 23.9 |
| | R14 = −813.65 | D14 = can be varied by zooming | | |
| | R15 = 138.18 | D15 = 7.30 | N9 = 1.49700 | $\nu$9 = 81.6 |

-continued

| | | F = 82.0 to 195.0 | FNo = 1:2.8 | 2ω = 29.5° to 12° | |
|---|---|---|---|---|---|
| III | | R16 = −33.75 | D16 = 1.40 | N10 = 1.83400 | ν10 = 37.2 |
| | | R17 = −52.92 | D17 = can be varied by zooming | | |
| | | R18 = 56.19 | D18 = 5.43 | N11 = 1.80400 | ν11 = 46.6 |
| | | R19 = 335.01 | D19 = 8.00 | | |
| | | R20 = 48.12 | D20 = 3.04 | N12 = 1.77250 | ν12 = 49.6 |
| | | R21 = 80.63 | D21 = 4.27 | | |
| | | R22 = −1129.31 | D22 = 5.02 | N13 = 1.80518 | ν13 = 25.4 |
| IV | | R23 = 41.68 | D23 = 14.35 | | |
| | | R24 = 160.36 | D24 = 4.47 | N14 = 1.62230 | ν14 = 53.2 |
| | | R25 = −72.79 | D25 = 21.53 | | |
| | | R26 = −41.18 | D26 = 1.66 | N15 = 1.77250 | ν15 = 49.6 |
| | | R27 = −91.11 | D27 = 3.00 | | |
| | | R28 = 70.09 | D28 = 3.80 | N16 = 1.72000 | ν16 = 50.2 |
| | | R29 = 387.33 | | | |

| f | 82 | 135 | 195 |
|---|---|---|---|
| D09 | 18.702 | 45.804 | 59.141 |
| D14 | 26.043 | 14.436 | 0.832 |
| D17 | 17.6 | 2.104 | 2.371 |

*D9 is the thickness of the lens when the object is at the infinity.

| Object Distance | ∞ | 1.8 m |
|---|---|---|
| D6 | 2.033 | 18.074 |

As will be understood from the foregoing description, in the zoom lens according to the present invention, the first lens group is disposed on the object side of the magnification varying lens group, and part of the lens groups in the first lens group which is disposed close to the image plane is moved along the optical axis for focusing. In consequence, variations in the aberration caused by focusing can be reduced, and a high optical performance can be achieved over the entire object distance. Furthermore, the weight of the focusing lens group can be reduced, and this permits both a small amount of auto focus driving force, while allowing the zoom lens to be focused quickly and with a high degree of accuracy. The arrangement also permits the zoom lens more easily to be made water-proof and dusttight.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. An internally focusing zoom lens having an optical axis comprising:

a first lens group having a positive refractive power, said first lens group consisting of a front lens sub-group that has a positive refractive power and a rear lens sub-group that has a negative refractive power and is disposed on an image plane side of said front lens sub-group, said rear lens sub-group further comprising a positive lens with one convex surface that is located on the image plane side thereof and a negative lens with two concave surfaces, said rear lens sub-group being adapted to move along the optical axis of said zoom lens for focusing;

a second lens group having a negative refractive power, said second lens group being moved along the optical axis of said zoom lens for zooming;

a third lens group which is moved along the optical axis for zooming; and a fourth lens group having a positive refractive power, wherein said first, second, third and fourth lens groups are disposed on the optical axis in that order with said first lens group being disposed closest to an object.

2. A zoom lens according to claim 1, wherein lens surfaces of said rear lens sub-group having absolute values of radii of curvature that are gradually reduced along the optical axis, with that of the lens surface disposed closest to the object having the largest radius of curvature.

3. A zoom lens according to claim 1, wherein the zoom lens fulfills the following conditions $$0.1 < N_{12P} - N_{12N} < 0.2$$

$$10 < \nu_{12N} - \nu_{12P} < 30 \qquad (1)$$

where $N_{12P}$ and $\nu_{12P}$ are respectively the refractive index and Abbe number of the material of said positive lens in said rear lens sub-group of the first lens group, and $N_{12N}$ and $\nu_{12N}$ are respectively the refractive index and Abbe number of the material of the negative lens in said rear lens sub-group of the first lens group.

4. A zoom lens according to claim 2, wherein the zoom lens fulfills the following conditions $$0.1 < N_{12P} - N_{12N} < 0.2$$

$$10 < \nu_{12N} - \nu_{12P} < 30 \qquad (1)$$

where $N_{12P}$ and $\nu_{12P}$ are respectively the refractive index and Abbe number of the material of said positive lens in said rear lens sub-group of the first lens group, and $N_{12N}$ and $\nu_{12N}$ are respectively the refractive index and Abbe number of the material of the negative lens in said rear lens sub-group of the first lens group.

5. A zoom lens according to claim 1, wherein the zoom lens fulfills the following conditions $$|R_{12P2}| > fT$$

$$|R_{12P1}| > fT \qquad (2)$$

where $R_{12P2}$ is a radius of curvature of the surface of the positive lens in said rear lens sub-group that is disposed closest to the image plane, $R_{12P1}$ is a radius of curvature of the surface of the negative lens in said rear lens sub-group that is disposed closest to the object, and fT is the focal length of the zoom lens which is positioned at its telephoto end.

6. A zoom lens according to claim 1, wherein said fourth lens group along its optical axis is comprised of a $IV_1$th lens group, a $IV_2$th lens group having a positive refractive power and a $IV_3$th lens group, said $IV_1$th lens group, said $IV_2$th lens group and said $Iv_3$th lens group being separated from each other by a wide air space.

7. A zoom lens according to claim 6, wherein said $Iv_1$th lens group of said fourth lens group is composed of two positive meniscus lenses each of which has a convex surface on its object side and a negative lens, wherein said $IV_2$th lens group is composed of a positive lens with two convex surfaces, and wherein said $IV_3$th lens group is composed of a negative meniscus lens with one convex surface being located on its image plane side and a positive lens, said individual lenses being disposed in that order on the optical axis with said two positive meniscus lenses being disposed closest to said object.

8. An internally focusing zoom lens having an optical axis comprising:
- a first lens group having a positive refractive power, said first lens group consisting of a front lens sub-group that has a positive refractive power and a rear lens sub-group that has a negative refractive power and is disposed on an image plane side of said front lens sub-group, said rear lens sub-group further comprising a positive lens with one convex surface that is located on the image plane side thereof, a negative lens with two concave surfaces, and wherein the surfaces of said rear lens sub-group have absolute values of radii of curvature that are gradually reduced along the optical axis, so that the lens surface disposed closest to the object has the largest radius of curvature, and wherein said rear lens sub-group further is adapted to move along the optical axis of said zoom lens for focusing;
- a second lens group having a negative refractive power, said second lens group being moved along the optical axis of said zoom lens for zooming;
- a third lens group which is moved along the optical axis for zooming; and
- a fourth lens group having a positive refractive power,
- wherein said first, second, third and fourth lens groups are disposed on the optical axis in that order with said first lens group being disposed closest to an object.

* * * * *

UNITED STATES PATENT AND TRADEMARK OFFICE
CERTIFICATE OF CORRECTION

PATENT NO. : 5,059,007

DATED : October 22, 1991

INVENTOR(S) : TSUNEFUMI TANAKA

It is certified that error appears in the above-identified patent and that said Letters Patent is hereby corrected as shown below:

Column 1:

Line 23, "camera. In" should read --camera. ¶ In--.

Column 2:

Line 23, "sub" should read --sub- --.

Line 43, "cross sectional" should read --cross-sectional--.

Line 52, "wideangle" should read --wide-angle--.

Line 57, "wideangle" should read --wide-angle--.

Line 68, "subgroup" should read --sub- --.

Column 3:

Line 13, "wideangle" should read --wide-angle--.

Column 4:

Line 5, "conditions." should read --conditions:--.

Line 10, "$V_{12P}$" should read --$\upsilon_{12P}$--.

Line 16, "of first" should read --of the first--.

Column 7:

Line 21, "Object Distance ∞ 1.8m" should read --Object Distance ∞ 1.8m--.

UNITED STATES PATENT AND TRADEMARK OFFICE
CERTIFICATE OF CORRECTION

PATENT NO. : 5,059,007
DATED : October 22, 1991
INVENTOR(S) : TSUNEFUMI TANAKA It is certified that error appears in the above-identified patent and that said Letters Patent is hereby corrected as shown below:

Column 7:

Line 38, "water-proof" should read --waterproof--.

Line 39, "dusttight" should read --dustproof--.

Column 8:

Line 35, "conditions" should read --conditions:--.

Line 48, "conditions" should read --conditions:--.

Line 60, "conditions" should read --conditions:--.

Column 9:

Line 9, "Iv$_3$th" should read --IV$_3$th--.

Line 12, "Iv$_1$th" should read --IV$_1$th--.

Signed and Sealed this

Twenty-seventh Day of April, 1993

Attest:

MICHAEL K. KIRK

*Attesting Officer*   *Acting Commissioner of Patents and Trademarks*